(12) United States Patent
Finck

(10) Patent No.: US 9,915,080 B2
(45) Date of Patent: Mar. 13, 2018

(54) DEPLOYABLE SHELTER STRUCTURE

(71) Applicant: Belron Hungary Kft—Zug Branch, Zug (CH)

(72) Inventor: William Finck, Brentwood (GB)

(73) Assignee: Belron International Limited, Egham (GB)

( * ) Notice: Subject to any disclaimer, the term of this patent is extended or adjusted under 35 U.S.C. 154(b) by 0 days.

(21) Appl. No.: 14/996,753

(22) Filed: Jan. 15, 2016

(65) Prior Publication Data

US 2016/0208514 A1 Jul. 21, 2016

Related U.S. Application Data

(63) Continuation of application No. 13/696,619, filed as application No. PCT/GB2011/050945 on May 18, 2011, now abandoned.

(30) Foreign Application Priority Data

May 20, 2010 (GB) .................................. 1008429.1

(51) Int. Cl.
| | |
|---|---|
| *E04H 15/06* | (2006.01) |
| *E04H 15/08* | (2006.01) |
| *B60P 3/34* | (2006.01) |
| *E04F 10/04* | (2006.01) |
| *E04H 15/04* | (2006.01) |

(52) U.S. Cl.
CPC ............. *E04H 15/06* (2013.01); *B60P 3/343* (2013.01); *E04H 15/08* (2013.01); *E04F 10/04* (2013.01); *E04H 15/04* (2013.01)

(58) Field of Classification Search
CPC ......... E04H 15/02; E04H 15/06; E04H 15/08; B60P 3/343
USPC .. 135/88.01, 88.05, 88.07, 88.09, 88.13, 90, 135/122; 296/159, 160, 163
See application file for complete search history.

(56) References Cited

U.S. PATENT DOCUMENTS

| | | |
|---|---|---|
| 3,156,497 A | 11/1964 | Lessard |
| 3,186,420 A | 6/1965 | Magee |
| 3,333,594 A | 8/1967 | Moss |
| 3,730,196 A | 5/1973 | Borskey |
| 4,163,295 A | 8/1979 | Schultz |
| 5,259,408 A | 11/1993 | Guerin |
| 5,529,368 A | 6/1996 | Cui et al. |
| 6,766,814 B2 | 7/2004 | Perrault |
| 2011/0232711 A1 | 9/2011 | Troxel et al. |

FOREIGN PATENT DOCUMENTS

| | | |
|---|---|---|
| DE | 9006445 U1 | 10/1990 |
| EP | 0011041 A1 | 5/1980 |
| EP | 0030398 A2 | 6/1981 |
| EP | 0204670 A2 | 12/1986 |

(Continued)

*Primary Examiner* — David R Dunn
*Assistant Examiner* — Danielle Jackson
(74) *Attorney, Agent, or Firm* — Gordon & Jacobson, P.C.

(57) ABSTRACT

A shelter structure arranged to be deployed from a stowed configuration above a vehicle to a deployed configuration, having a number of elongate stays for supporting a flexible awning, the stays being movable to fan out from a stowed configuration to a fanned out configuration when deployed. The structure is provided with a mounting permitting the structure to move with respect to the mounting when deployed to selectively cover alternative sheltered zones in a deployed configuration.

9 Claims, 8 Drawing Sheets

(56) References Cited

FOREIGN PATENT DOCUMENTS

| | | |
|---|---|---|
| EP | 0881117 | 7/1999 |
| EP | 1314607 A1 | 5/2003 |
| FR | 2419045 A1 | 10/1979 |
| WO | WO98/07937 A1 | 2/1998 |
| WO | WO03/035995 A1 | 5/2003 |
| WO | WO2004/099528 A1 | 11/2004 |

DEPLOYABLE SHELTER STRUCTURE

CROSS-REFERENCE TO RELATED APPLICATIONS

This application is a continuation of U.S. non-provisional application Ser. No. 13/696,619, filed on Dec. 28, 2012, which is the national stage entry of PCT/GB2011/050945, filed on May 18, 2011, and which claims priority from GB 1008429.1, filed on May 20, 2010, all of which are hereby incorporated by reference herein in their entireties.

BACKGROUND OF THE INVENTION

1. Field of the Invention

The present invention relates to a deployable shelter structure, and particularly to such a structure which is vehicle mountable or mounted.

2. State of the Art

In certain pastimes and occupations it is desirable to have a vehicle roof mounted shelter structure that is deployable from a stowed condition to cover a sheltered zone adjacent the vehicle.

Deployable shelter structures for vehicle mounted applications are disclosed in, for example EP08811172, U.S. Pat. No. 3,730,196.

An improved arrangement has now been devised.

SUMMARY OF THE INVENTION

According to a first aspect, the present invention provides a shelter structure arranged to be deployed from a stowed configuration to a deployed configuration, the shelter structure comprising:
  a plurality of elongate stays for supporting a flexible awning, the stays arranged to be movable so as to fan out from a stowed configuration to a fanned out configuration when deployed;
  wherein the structure is provided with a mounting permitting the structure to move with respect to the mounting when deployed to selectively cover alternative sheltered zones in the deployed configuration.

For example in one deployed position, in which the structure is carried on the roof of a vehicle, the structure may cover a first sheltered zone to the side of the vehicle in a first position, and be movable to cover an alternative sheltered zone to the rear of the vehicle in another deployed position.

In the stowed configuration the stays preferably lie closely adjacent or contiguous with one another. A flexible fabric sheet awning is preferably secured to the stays.

It is preferred that the mounting comprises a rotatable mounting hub permitting the structure to be selectively rotated to cover alternative sheltered zones in the deployed configuration.

Beneficially, the stays are movably articulated to the rotary mounting hub. This may conveniently be achieved by means of having the stays pivotally or hinge mounted to the hub.

In a preferred embodiment the hinge or pivot mountings for the stays are predominantly offset to one side of the rotational axis of the rotary mounting hub. Beneficially the stays have respective hinges, having hinge axes that are substantially parallel and preferably oriented upright. This ensures that the stays are mounted level with one another.

In a preferred embodiment, the support stays are supported by flexible support lines connected to a line anchor structure; the line anchor structure being re-orientatable between a stowed configuration and an erect configuration.

This is believed to be novel and inventive per se. Accordingly, according to a second aspect, the invention provides a shelter structure arranged to be deployed from a stowed configuration to a deployed configuration, the shelter structure comprising:
  a plurality of elongate stays for supporting a flexible awning, the stays arranged to be movable so as to fan out from a stowed configuration to a fanned out configuration when deployed;
  the elongate stays being supported by flexible support lines connected to a line anchor structure; the line anchor structure being re-orientatable between a stowed configuration and an erect configuration.

It is preferred that the line anchor structure is pivotally mounted to be re-orientatable between the stowed configuration and the erect configuration.

Beneficially, the line anchor structure is arranged to lie adjacent the stays in the stowed configuration and extend transversely to the stays when in the erect configuration. Beneficially locking means is provided to lock the line anchor structure in the erect configuration. The locking mean preferably needs to be overridden before the anchor structure can be returned to the stowed position.

Preferably the arrangement is such that the flexible support lines remain connected to the support anchor structure and the stays in both the stowed and deployed condition.

It is preferred that the line anchor structure is fixed so as not to rotate with the rotary hub.

The structure is preferably provided with means for securing to the roof of a vehicle.

In a preferred embodiment the structure is preferably provided with an elongate stowage container, the stays being stowed within the stowage container in the stowed configuration.

In a preferred embodiment the mounting permitting movement of the stays is provided at one end of the stowage container.

In a preferred embodiment the stays are arranged to fan out from the stowage container, during deployment, via an opening running along a longitudinal side of the container.

Beneficially the container comprises a vehicle roof mounted or mountable container.

According to a further aspect, the invention provides a shelter structure arranged to be deployed from a stowed configuration to a deployed configuration, the shelter structure comprising:
  a plurality of elongate stays for supporting a flexible awning, the stays arranged to be movable so as to fan out from a stowed configuration to a fanned out configuration when deployed;
  an elongate stowage container, the stays being stowed within the stowage container in the stowed configuration.

The invention will now be further described in specific embodiments and by way of example only, with reference to the accompanying drawings.

DETAILED DESCRIPTION OF THE PREFERRED EMBODIMENTS

Figure 1:
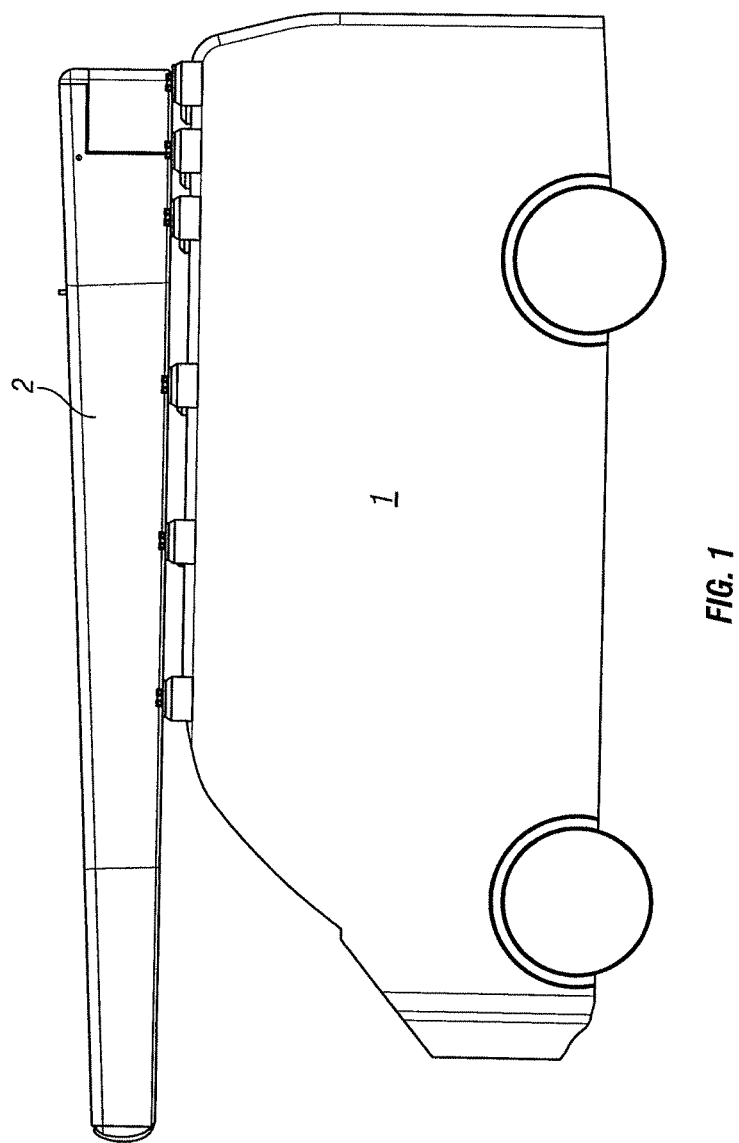
FIG. 1 is a schematic side view of a vehicle having a mounted deployable shelter structure in accordance with the invention.

Referring to the drawings and initially to FIG. 1, there is shown a vehicle 1 having a roof mounted storage container 2 which is arranged to store the deployable shelter structure, enabling the deployable shelter structure to be transported. The storage container is elongate, extending completely from the front to the rear of the vehicle, and secured by means of aluminium battens 101 to the roof of the vehicle.

Figure 2:
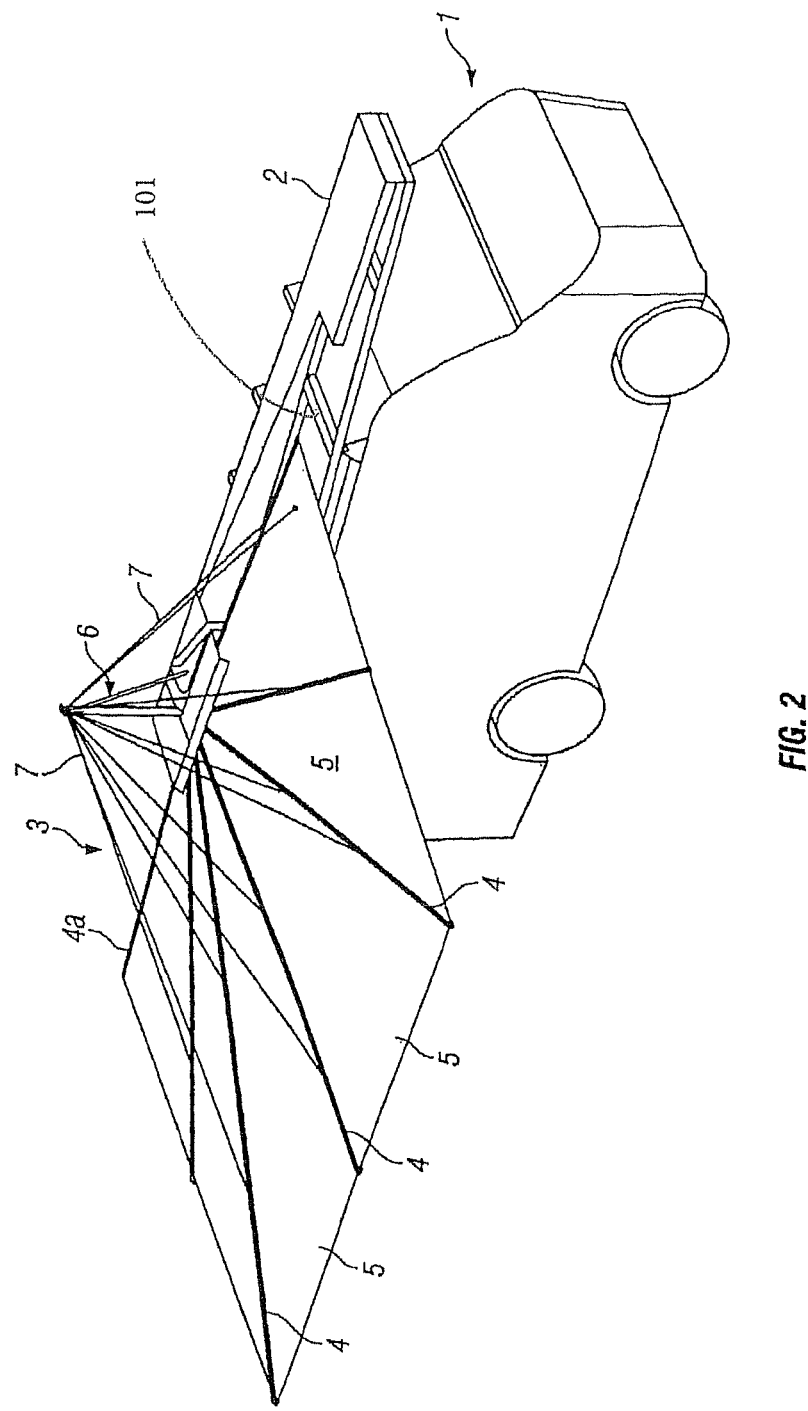
FIG. 2 is a perspective view of the deployable shelter structure in a first deployed configuration.

Referring now to FIG. 2, there is shown a deployable shelter structure 3 in a first deployed configuration positioned to the side of the vehicle 1. As can be seen, the storage container 2 is arranged to be open or openable along substantially its entire length along one longitudinal side, permitting the shelter stays and awning to fan out through the open side from the stowed to the fanned out, deployed condition.

The shelter structure 3 is in the form of an awning having a series of elongate stays 4 and secured between adjacent stays, respective portions of a flexible awning fabric 5. The awning structure is deployable in a 'fan like' fashion such that in the stored condition in the roof-top container 2, the respective elongate stays 4 lie closely adjacent one another. When deployed the elongate stays 4 fan out and separate from one another in order to expand the awning to the configuration shown in FIG. 2. The fawning fabric is cut to provide a generally rectangular awning when fully fanned out.

An anchor post structure 6 is erected to the configuration shown in FIG. 2 from a stowed orientation in the roof top container 2. Suspension wires 7 are secured to the top of the anchor post arrangement 6 and connect to respective elongate stays 4. Each elongate stay 4 is supported by two separate suspension wires connecting at spaced portions along the length of the relevant stay 4.

Figure 4:
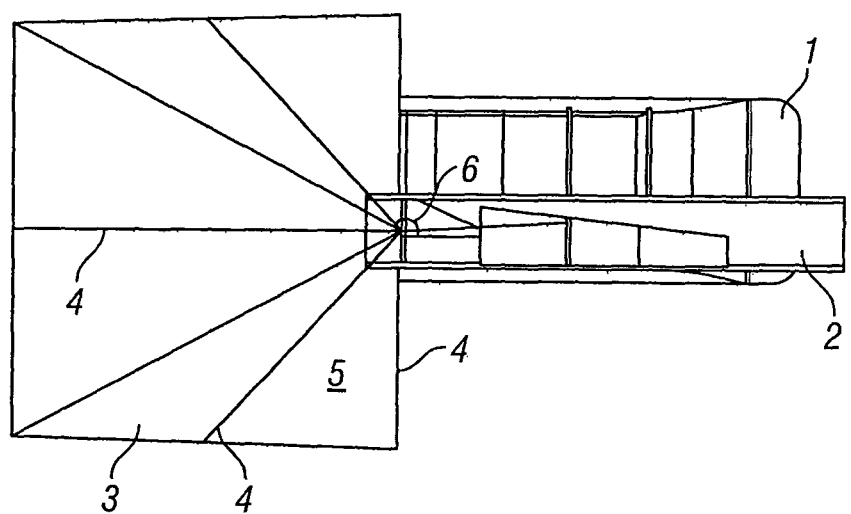
FIG. 4 is a plan view of the deployable shelter structure in a second deployed configuration.
Figure 5:
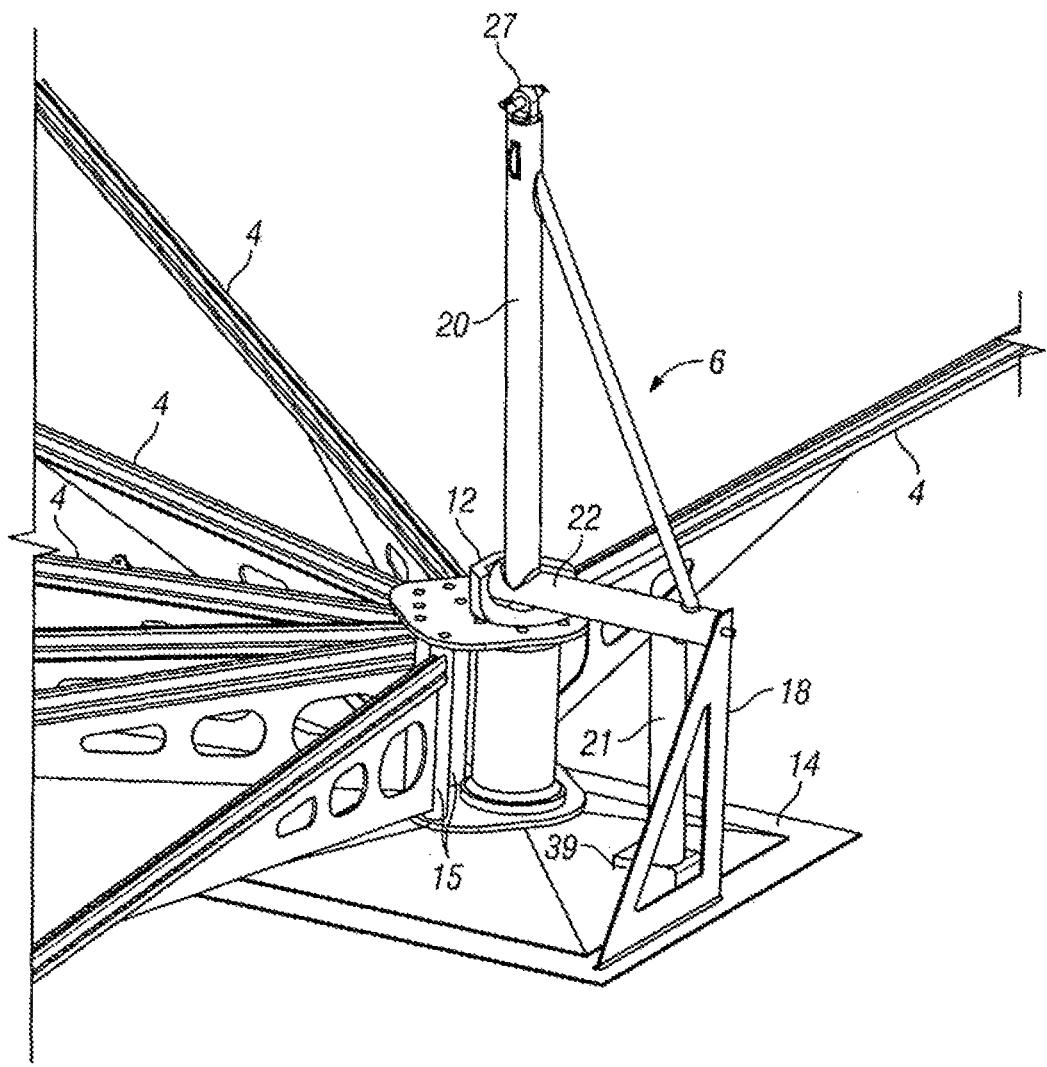
FIG. 5 is a schematic perspective view of the deployment mechanism of the deployable shelter structure.
Figure 6:
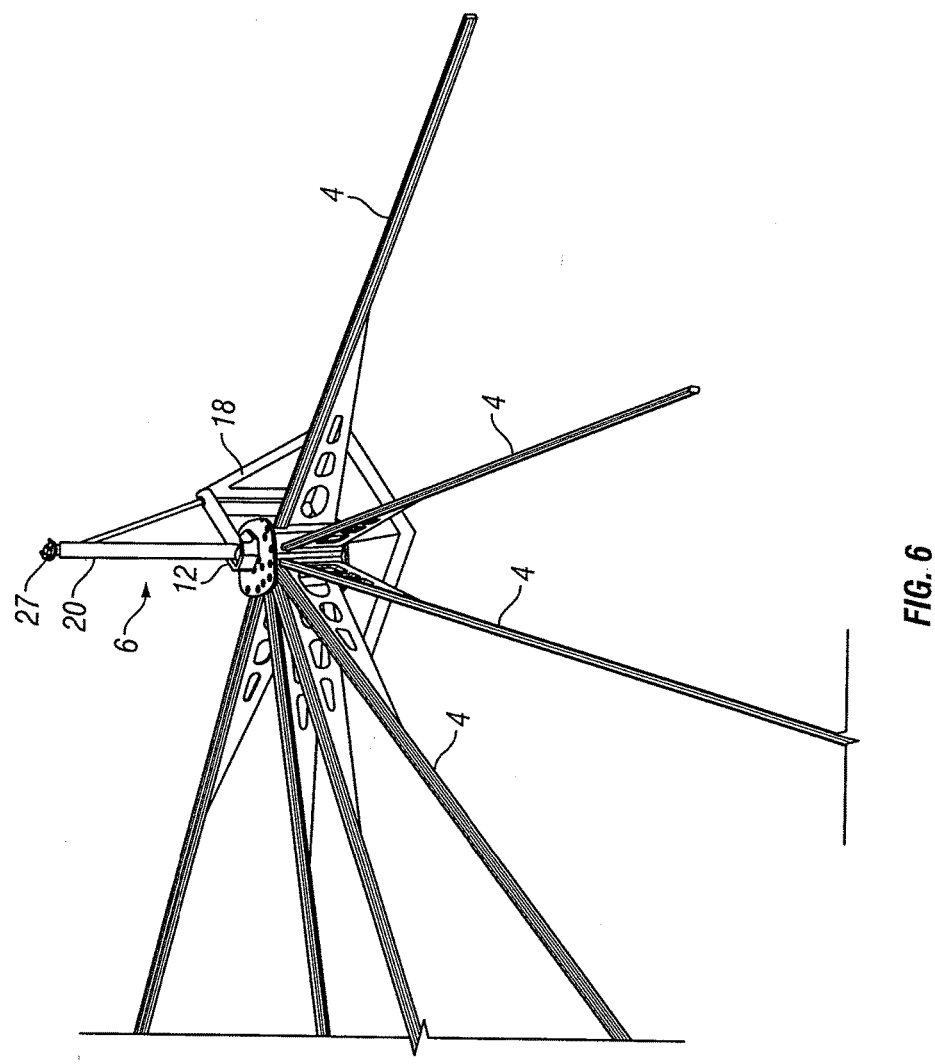
FIG. 6 is an alternative perspective view of the deployment mechanism of FIG. 5.

As shown in FIG. 4, the awning shelter structure 3 is deployable in alternative locations with respect to the mounting post structure 6. In the first deployment orientation, the awning structure is to the side of the vehicle 1. In the second orientation, the awning structure 3 is positioned to the rear of the vehicle 1. This is the situation shown in FIG. 4. The mounting of the structure is therefore such that the structure is enabled to move with respect to the mounting when deployed to selectively cover alternative sheltered zones in the deployed configuration.

The deployment mechanism is shown most clearly in FIGS. 5 to 9. The deployment mechanism comprises the anchor post arrangement 6 and a mounting hub 8 for the elongate stays 4.

Figure 7:
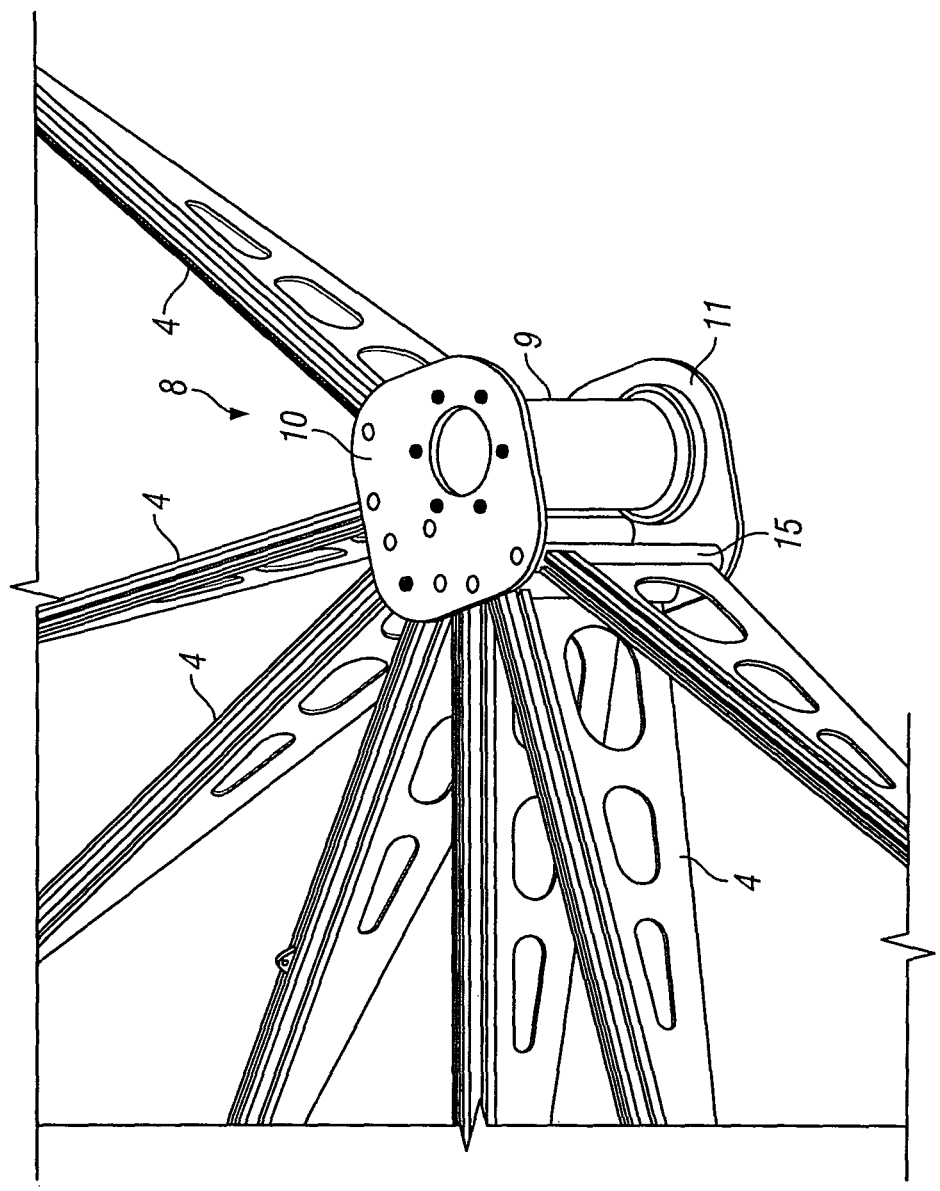
FIG. 7 is a perspective view of the deployment mechanism without the line anchor post inserted.
Figure 8:
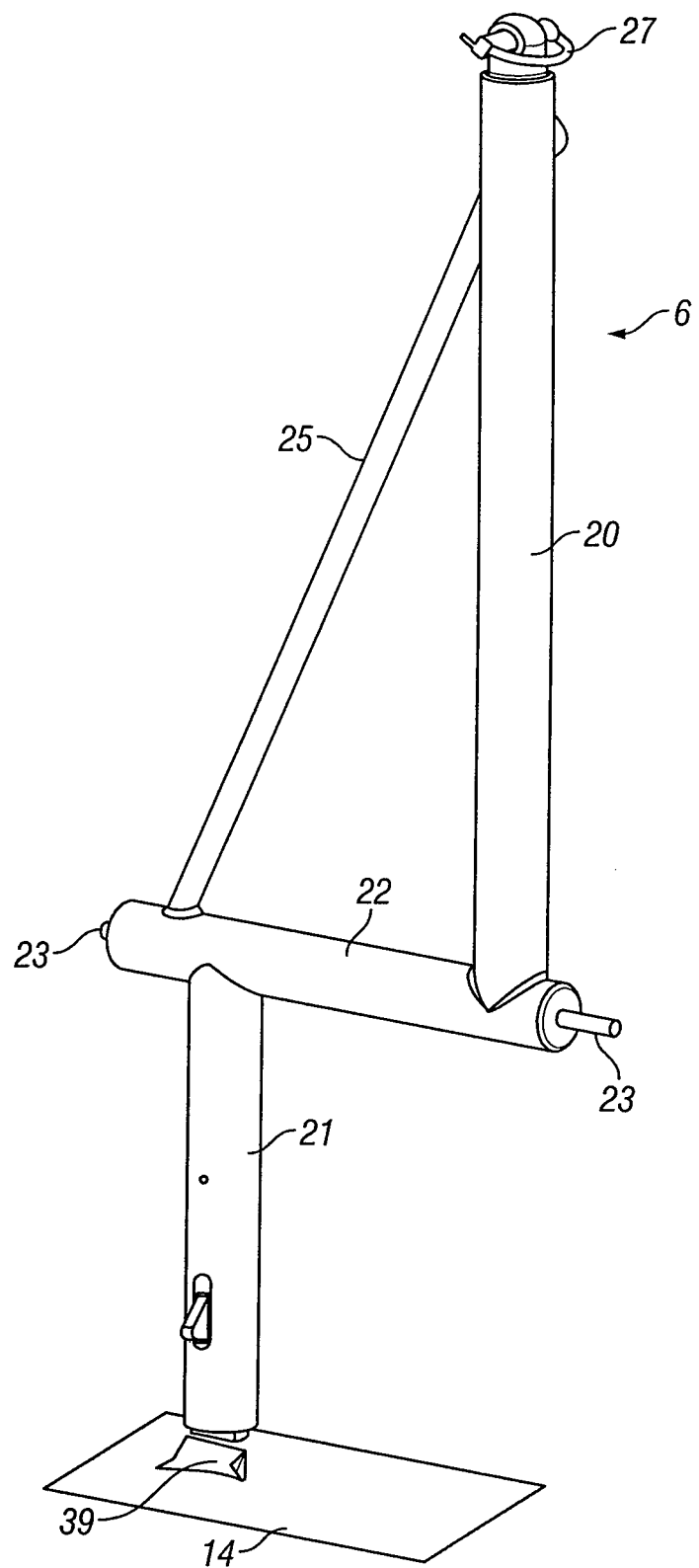
FIG. 8 is a perspective view of the line anchor post.
Figure 10:
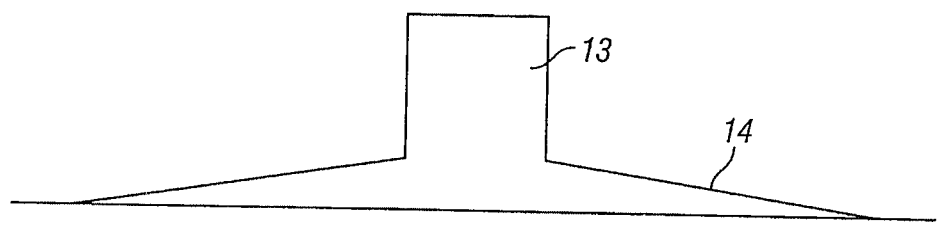
FIG. 10 is a side view of a mounting plate for mounting the line anchor post.

The mounting hub 8 is shown most clearly in FIG. 7. The mounting hub 8 is rotatably mounted on metal base plate 14 which is bolted to the battens 101 on the vehicle roof. The mounting hub 8 includes a tubular section 9 extending between two opposed flanges 10 and 11. The flanges 10, 11 are provided with apertures arranged to respectively co-align with the internal bore of tubular section 9. The stem of an anchor post structure mounting bracket 12 is arranged to be received in the bore 9 on the upper side of the hub 8. The lower side of the hub 8 is arranged to sit upon a rotational mount post 13 (see FIG. 10) which extends upwardly from the base support 14. The mount post 13 is received in the internal bore of the tubular member 9. When mounted on the mount post 13, the hub structure 8 is arranged to bodily rotate about the mount post 13 and accordingly rotates with respect to the support plate 14.

Hinge posts 15 also extend between the upper and lower flanges 10, 11 of the hub structure 8, each respective hinge post 15 being rigidly connected to a respective elongate stay 4. Accordingly, the respective elongate stays 4 may be hinged from a position in which the adjacent stays 4 lie contiguous against one another in the storage condition in storage container 2 to a position as shown as deployed in FIGS. 5 to 7 in which the elongate stays 4 are hinged to be spaced from one another in a deployed, fanned out, configuration. The hinge post axes are substantially parallel and oriented upright. This ensures that the stays 4 are mounted level with one another.

It should be noted that the position of the respective hinges 15 are offset to one side of the access or rotation of the hub structure 8 about mounting post 13. It should further be noted that the deployment mechanism includes the rotatable hub and further that the stays are hinge mounted to the rotatable hub structure 8. Rotatable hub structure 8 enables the awning structure to be orientated, in its deployed configuration, in a position either to the side of a vehicle or to the rear of the vehicle. It should further be noted that the hub structure 8 and the line anchor post 6 (i.e. the deployment mechanism) is mounted at the rear of the vehicle/storage container. This provides for the maximum length of elongate stays 4 to be used with respect to the vehicle upon which it is mounted.

The mounting bracket 12, in combination with further support bracket 18 fixed to the mounting plate 14, is used to pivotally mount the line anchor post structure 6. The line anchor post structure 6 is mounted such that it is pivotal from a stored orientation in the confines of the container (or lying flat on top of the container), extending in a longitudinal direction of the stays 4 and arranged to lie above the stays 4, to an erect orientation extending upwardly above the roof of the vehicle. This ensures that the line anchor point provided by the 'D' ring 27 is at a sufficient height above the roof of the vehicle.

The line anchor post structure 6 includes an upper portion 20 and a depending leg 21. A cross member 22 connects the upper portion 20 and the depending leg 21. Cross member 22 is provided at opposed ends with respective ends of a pivot rod 23 which are rotatably mounted in apertures in the respective brackets (12 and 18). A strengthening strut 25 connects to cross member 22 with the uprights 20.

The 'D' ring structure 27 is rotatably mounted in the tubular end of upright 20. The D ring is used to provide an anchor point for the support lines 7.

Figure 9:
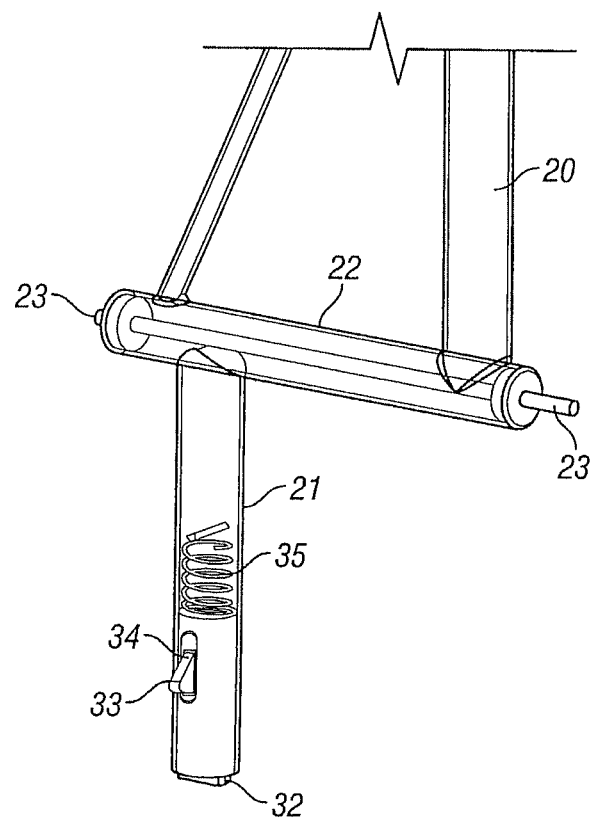
FIG. 9 is a detailed view of the line anchor post arrangement of FIG. 8.

As shown most clearly in FIG. 9, internally of the lower end of the depending tubular leg 21, there is positioned a spring-loaded detent 32. The detent 32 is normally biased by spring 35 to a position in which it extends beyond the lower limit of the tubular leg 21. The detent 32 can be moved upwardly to be retracted internally of the tubular leg 21 by means of actuation of the slider 33 which extends through the slot 34 in the peripheral wall of the tubular leg 21. As the line anchor post structure 6 is deployed from a stored orientation to its upright orientation, the detent 32 passes over a stop formation 39 provided on the support plate 14 (see FIG. 8). As the detent 32 springs back to its extended position, the line anchor post structure 6 cannot be pivoted back to the stored orientation without activation of the slider 33. This ensures that once the line anchor post structure is deployed, it remains in its upright configuration until intentionally returned to its stowed configuration.

In order to erect the shelter structure, the anchor post is first erected from the stowed condition as described. The lines 7 are permanently connected to the stays 4 and the 'D' ring 27 but are in a slackened condition. The stays 4 and connecting awning material 5 are then drawn out of the roof container 2 through the elongate side opening. This is achieved by the user taking hold of the outermost stay (4a in FIG. 2) and drawing in an arc about the line anchor post structure 6. This causes the following stays to be drawn successively out of the container. As this happens, the lines 7 tighten as the free ends of the stays dip because they are no loner supported in the container. The structure is then suspended by the lines 7 connected to the top of the line anchor post structure 6.

Figure 3:
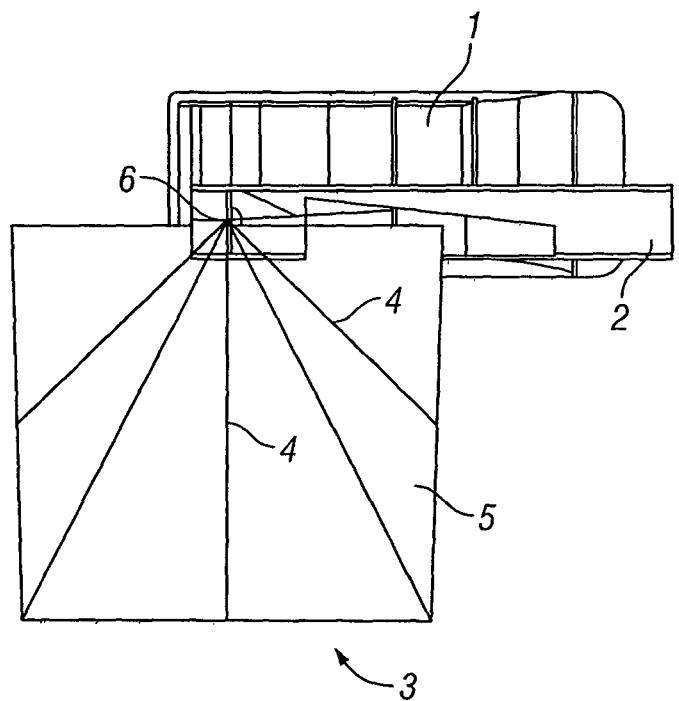
FIG. 3 is a plan view of the arrangement of FIG. 2.

If it is desired to orient the structure in the position of FIG. 2, sheltering to the side of the vehicle, then the end stays are tied off at this point. Alternatively, if it is desired to position the structure to shelter to the rear of the vehicle, then the user continues to raw stay 4a around the post, causing the entire hub structure 8 to rotate and the shelter structure to move from the position as shown in FIG. 3 through 90 degrees to the position shown in FIG. 4.

The structure of the invention has utility in various commercial and recreational situations. For example, the shelter can be deployed from a mobile windshield repair van which is parked adjacent a customer vehicle needing a windshield replacement or repair. The structure provides some shelter from the elements whist the technician conducts the windshield replacement or repair.

The invention claimed is:

1. A shelter structure arranged to be deployed from a stowed configuration to a deployed configuration, the shelter structure comprising:
   a plurality of elongate stays for supporting a flexible awning each stay extending along a respective longitudinal axis;
   a single rotatable hub mounting for the elongate stays, wherein the rotatable hub mounting is arranged to rotate about a fixed rotational axis and provide pivoting movement of the stays so as to fan out from a stowed configuration to a fanned out configuration when deployed, wherein in the fanned out configuration, the longitudinal axes for all of the stays converge on the rotatable hub mounting; and
   an elongate vehicle roof mounted or mountable stowage container, the stays being stowed within the stowage container in the stowed configuration;
   wherein the stays are arranged to fan out from the stowage container during deployment, via an opening running along a longitudinal side of the stowage container; and
   wherein the rotatable hub mounting is disposed proximate an end of the stowage container, and wherein:
   the rotatable hub mounting permits the structure to move with respect to the rotatable hub mounting when deployed to selectively cover alternative sheltered zones in the deployed configuration.

2. A shelter structure according to claim 1, wherein:
   in the stowed configuration, the stays are horizontally adjacent one another.

3. A shelter structure arranged to be deployed from a stowed configuration to a deployed configuration, the shelter structure comprising:
   a plurality of elongate stays for supporting a flexible awning each stay extending along a respective longitudinal axis;
   a single rotatable hub mounting for the elongate stays, wherein the rotatable hub mounting is arranged to rotate about a fixed rotational axis and provide pivoting movement of the stays so as to fan out from a stowed configuration to a fanned out configuration when deployed, wherein in the fanned out configuration, the longitudinal axes for all of the stays converge on the rotatable hub mounting; and
   an elongate vehicle roof mounted or mountable stowage container, the stays being stowed within the stowage container in the stowed configuration;
   wherein the stays are arranged to fan out from the stowage container during deployment, via an opening running along a longitudinal side of the stowage container; and
   wherein the rotatable hub mounting is disposed proximate an end of the stowage container, and wherein:
   rotation of the rotatable hub mounting about the fixed rotational axis provides for movement of the fanned out configuration of stays between different deployed positions of the awning structure.

4. A shelter structure according to claim 3, wherein:
   the different deployed positions of the awning structure cover alternative sheltered zones.

5. A shelter structure according to claim 4, wherein:
   the alternative sheltered zones are on different sides of a vehicle on which the stowage container is mounted.

6. A shelter structure according to claim 3, wherein:
   in the stowed configuration, the stays are horizontally adjacent one another.

7. A shelter structure arranged to be deployed from a stowed configuration to a deployed configuration, the shelter structure comprising:
   a plurality of elongate stays for supporting a flexible awning each stay extending along a respective longitudinal axis;
   a single rotatable hub mounting for the elongate stays, wherein the rotatable hub mounting is arranged to rotate about a fixed rotational axis and provide pivoting movement of the stays so as to fan out from a stowed configuration to a fanned out configuration when deployed, wherein in the fanned out configuration, the longitudinal axes for all of the stays converge on the rotatable hub mounting; and
   an elongate vehicle roof mounted or mountable stowage container, the stays being stowed within the stowage container in the stowed configuration;
   wherein the stays are arranged to fan out from the stowage container during deployment, via an opening running along a longitudinal side of the stowage container; and
   wherein the rotatable hub mounting is disposed proximate an end of the stowage container,
   wherein the rotatable hub mounting is arranged to rotate about the fixed rotational axis relative to a base plate, and wherein
   the rotatable hub mounting includes a tubular section that defines an internal bore, and
   the fixed rotational axis is defined by a post that extends upwardly from the base support and that is received by the internal bore of the tubular section.

8. A shelter structure according to claim 7, wherein:
the base plate is mounted or mountable to a vehicle roof.

9. A shelter structure according to claim 7, wherein:
in the stowed configuration, the stays are horizontally adjacent one another.

\* \* \* \* \*